US 8,300,585 B2

(12) United States Patent
Xu et al.

(10) Patent No.: US 8,300,585 B2
(45) Date of Patent: Oct. 30, 2012

(54) METHOD AND APPARATUS FOR TRANSMITTING AN ACK/NACK SIGNAL IN A WIRELESS COMMUNICATION SYSTEM

(75) Inventors: Changlong Xu, Beijing (CN); Qinghua Li, San Ramon, CA (US); Yuan Zhu, Beijing (CN); Hongmei Sun, Beijing (CN); Jong-Kae Fwu, Sunnyvale, CA (US); Hujun Yin, Saratoga, CA (US); Sassan Ahmadi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 429 days.

(21) Appl. No.: 12/554,355

(22) Filed: Sep. 4, 2009

(65) Prior Publication Data

US 2011/0058522 A1  Mar. 10, 2011

(51) Int. Cl.
*H04W 4/00* (2009.01)
*H04W 72/12* (2009.01)
*H04L 27/26* (2006.01)

(52) U.S. Cl. .......................... 370/329; 370/338; 370/341
(58) Field of Classification Search ........................ None
See application file for complete search history.

(56) References Cited

U.S. PATENT DOCUMENTS

| | | | |
|---|---|---|---|
| 2010/0172318 A1* | 7/2010 | Zhu et al. | 370/330 |
| 2010/0202372 A1* | 8/2010 | Chun et al. | 370/329 |
| 2010/0272014 A1* | 10/2010 | Orlik et al. | 370/328 |
| 2010/0329316 A1* | 12/2010 | Sun et al. | 375/221 |

OTHER PUBLICATIONS

International Search Report and Written Opinion for International Patent Application No. PCT/US2010/044112, Mailed Apr. 21, 2011, 10 pages.
Chang, Xin, et al., "Modified Text for the UL HARQ Feedback Channel Section of SDD", IEEE 802.16m Broadband Wireless Access Working Group, IEEE C802.16m-09/0130, (Jan. 5, 2009), pp. 1-8.
Fwu, Jong-Kae, et al., "Proposed Text for the Draft P802.16m Amendment on the PHY Structure for UL Control", IEEE 802.16m Broadband Wireless Access Working Group, IEEE C802.16m-09/386, (Mar. 2, 2009), pp. 1-18.
Srinivasan, Roshni, et al., "Proposed Changes/Refinements to Section 11.9 (UL Control) of IEEE 802.16m SDD (802.16m-09/0034)", IEEE 802.16m Broadband Wireless Access Working Group, IEEE C802.16m-09/1668r1, (Aug. 30, 2009), pp. 1-9.
Yoo, Hwasun, et al., "Physical Structure of UL Feedback Channels", IEEE C802.16m-08/982r1, (Sep. 5, 2008), pp. 1-16.
Yoo, Hwasun, et al., "Proposal for Physical Structure of UL Feedback Channel", IEEE C802.16m-09/0190r1, (Jan. 7, 2009), pp. 1-17.

* cited by examiner

*Primary Examiner* — Chi Pham
*Assistant Examiner* — Soon-Dong D Hyun
(74) *Attorney, Agent, or Firm* — Kacvinsky Daisak, PLLC

(57) ABSTRACT

Machine-readable media, methods, apparatus and system for transmitting ACK/NACK signal in a wireless communication system are described. In some embodiments, a sequence corresponding to one of acknowledge (ACK) information and non-acknowledge (NACK) information may be determined. Then, the sequence may be mapped onto a transmission channel for later transmission from the mobile station to a base station. In some embodiments, the transmission channel may be allocated with at least a part of three feedback mini-tiles (FMTs), wherein each of the FMTs comprises two subcarriers contiguous in frequency domain by six orthogonal frequency division multiplexing (OFDM) symbols contiguous in time domain and the three FMTs being discontinuous in frequency domain.

25 Claims, 9 Drawing Sheets

METHOD AND APPARATUS FOR TRANSMITTING AN ACK/NACK SIGNAL IN A WIRELESS COMMUNICATION SYSTEM

BACKGROUND

According to institution of electrical and electronics engineers (IEEE) 802.16m standard published in July 2009, an uplink hybrid automatic repeat request (UL HARQ) scheme is used to detect and correct errors in data transmitted from a base station to a mobile station. The mobile station may detect if an error is included in the received data. If no error is detected, the mobile station may send an acknowledgement (ACK) signal to the base station. Otherwise, the mobile station may send a non-acknowledgement (NACK) signal to the base station, so that the base station may be informed that the data is unsuccessfully received and may retransmit the data to the mobile station.

Therefore, the ACK/NACK signal is important to ensure communication reliability. Usually, a dedicated channel resource may be allocated to transmit the ACK/NACK signal.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes method and apparatus for transmitting an ACK/NACK signal in a wireless communication system. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or sending information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
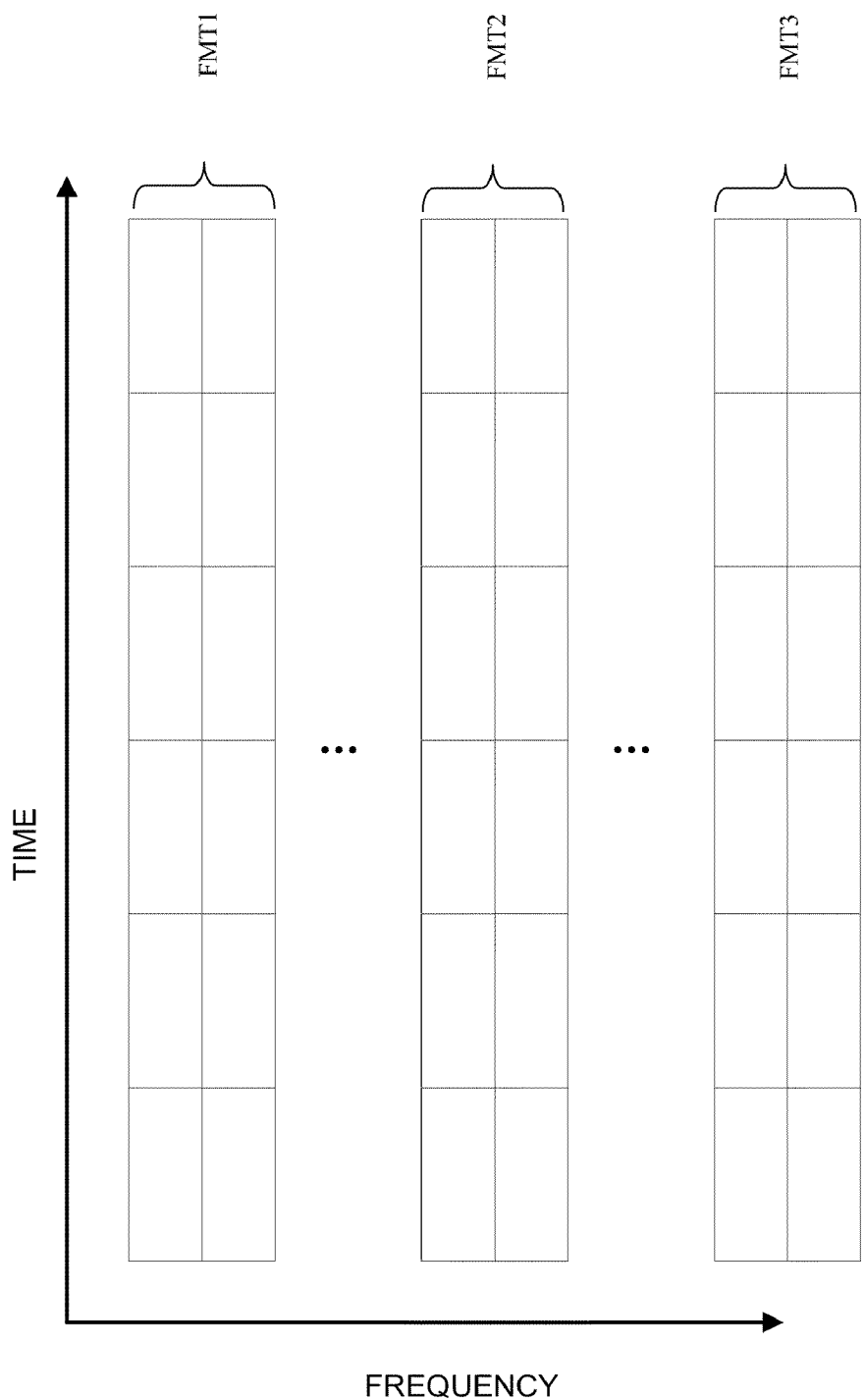
FIG. 1 illustrates an embodiment of a physical structure of an uplink ACK/NACK feedback channel resource unit.

FIG. 1 illustrates an embodiment of a physical structure of an uplink ACK/NACK feedback channel resource unit. In the embodiment, the uplink ACK/NACK feedback channel resource unit may be used to transmit an ACK/NACK signal from a mobile station to a base station in a wireless communication system, such as an orthogonal frequency division multiplexing (OFDM) system. As illustrated, the uplink ACK/NACK feedback channel resource unit may comprise three feedback mini tiles (FMTs), e.g., FMT 1-FMT 3. Each of FMT 1-FMT 3 may be defined as two subcarriers contiguous in a frequency domain by six OFDM symbols contiguous in a time domain, 2×6 tiles for short. Any two of FMT 1-FMT 3 may be discontinuous in the frequency domain in order to achieve frequency diversity among the FMTs. For example, FMT 1 may be discontinuous in frequency with either FMT 2 or FMT 3.

According to IEEE 802.16m, the uplink ACK/NACK feedback channel resource unit may accommodate up to six uplink ACK/NACK feedback channels, each of which may be used to transmit the ACK/ACK signal for one mobile station, without scarifying transmission performance, e.g., target packet error rate for ACK to NACK being no higher than 1% and target packet error rate for NACK to ACK being no higher than 0.1%. In an embodiment, the uplink ACK/NACK feedback channel resource unit may be used to transmit ACK/NACK signals for up to six mobile stations, and meanwhile meeting the performance requirement.

Figure 2B:
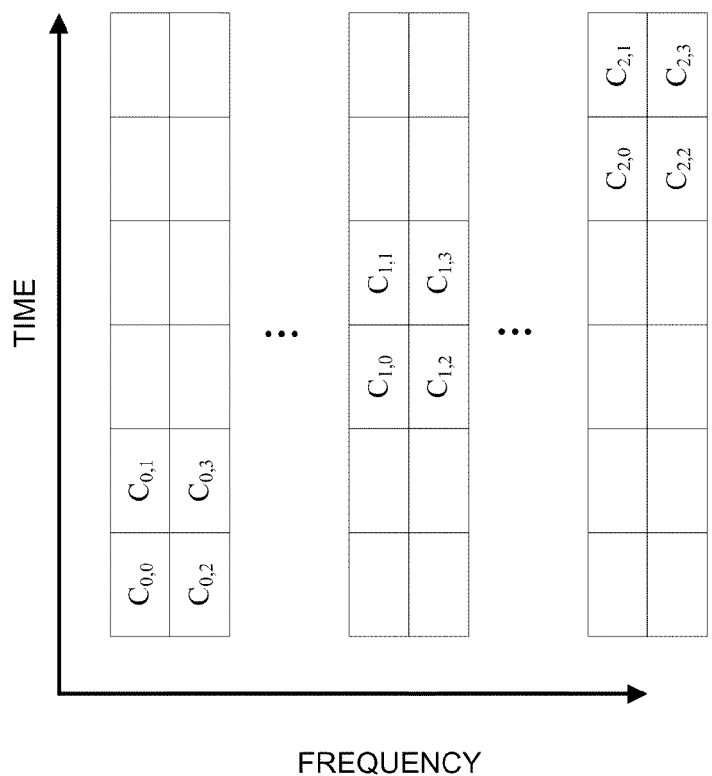
FIG. 2B illustrates an embodiment of mapping a 12-bit sequence on an uplink ACK/NACK feedback channel based on the TDM/CDM design of FIG. 2A.
Figure 2A:
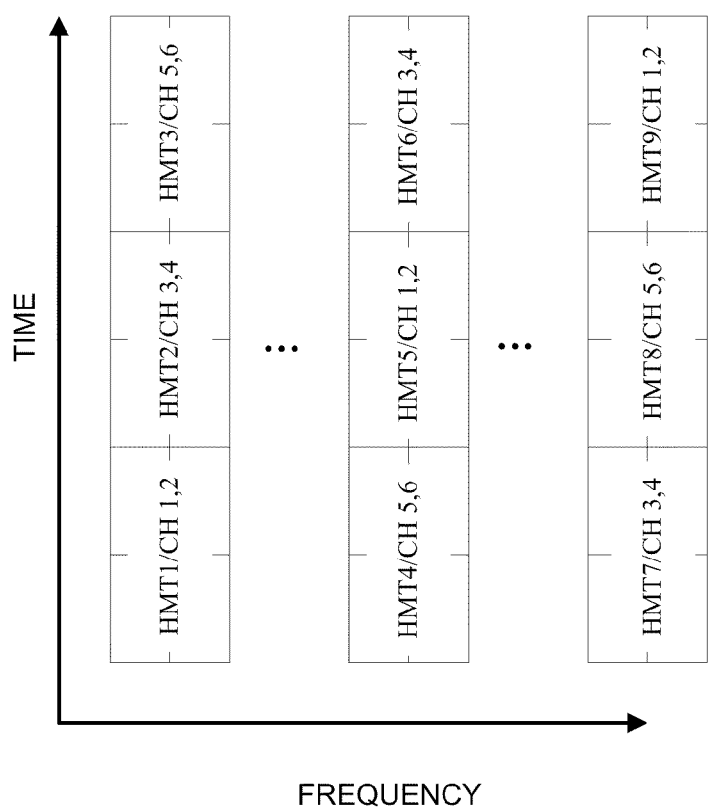
FIG. 2A illustrates an embodiment of a time division multiplexing/code division multiplexing (TDM/CDM) design based on the uplink ACK/NACK feedback channel resource unit.

FIG. 2A illustrates an embodiment of a TDM/CDM design based on the uplink ACK/NACK feedback channel resource unit. Taking the uplink ACK/NACK feedback channel resource unit accommodating six uplink ACK/NACK feedback channels as an example, FMT 1-FMT 3 may be divided into 9 HARQ mini tiles (HMTs), i.e., HMT 1-HMT 9. Each of HMT 1-HMT 9 may be defined as two subcarriers contiguous in frequency by two OFDM symbols contiguous in time, 2×2 tiles for short.

Each pair of ACK/NACK feedback channels may be allocated with three HMTs to transmit the ACK/NACK signal. For example, ACK/NACK feedback channels 1 and 2 (referred as "CH 1, 2" in FIG. 2A) may be allocated with HMT 1, HMT 5 and HMT 9. Each ACK/NACK feedback channel may be used for one mobile station to transmit the ACK/NACK signal to the base station. In order to improve frequency diversity and/or time diversity, the three HMTs may locate in different frequency and/or time. In an embodiment, HMT 1 may locate in frequency and time different from HMT 5 or HMT 9. For example, HMT 1 may locate in frequency discontinuous with HMT 5 or HMT 9. Since two HARQ feedback channels share the same resource, the design of FIG. 2A may be referred as TDM/CDM design.

It should be understood that other embodiments may implement other modifications and variations to the design of FIG. 2A. For example, the uplink ACK/NACK feedback channel resource unit may accommodate less than six ACK/NACK feedback channels. For another example, any two of the three HMTs may be contiguous in frequency and/or time.

Based on the TDM/CDM design of FIG. 2A, a sequence of 12-bit length may be used to represent the ACK/NACK feedback for one ACK/NACK feedback channel. In an embodiment, the sequence may be generated through selecting a 4-bit subsequence from a plurality of orthogonal subsequences, e.g., four orthogonal subsequences as shown in Table 1, and repeating the 4-bit subsequence for three times to provide the 12-bit sequence. It should be understood that Table 1 is provided for illustration, other corresponding relationships between the subsequences and the ACK/NACK feedback may be generated, and for example, subsequence #1 may represent ACK feedback for Channel 2. Moreover, other subsequences may be used to represent the ACK/NACK feedback. The same or similar scheme may be applied to the ACK/NACK feedback for other channels, such as Channels 3, 4, 5 and 6.

In another embodiment, the sequence may be generated through selecting a 12-bit sequence from a plurality of orthogonal sequences, e.g., four orthogonal sequences as shown in Table 2. It should be understood that Table 2 is provided for illustration, other corresponding relationships between the sequences and the ACK/NACK feedback may be generated, and for example, sequence #1 may represent ACK feedback for Channel 2. Moreover, other sequences may be used to represent the ACK/NACK feedback. The same or similar scheme may be applied to the ACK/NACK feedback for other channels, such as channels 3, 4, 5 and 6.

TABLE 1

4-bit length orthogonal subsequence

| # | Subsequence | ACK/NACK feedback |
|---|---|---|
| 1 | +1 +1 +1 +1 | CH 1, ACK |
| 2 | +1 −1 +1 −1 | CH 1, NACK |
| 3 | +1 +1 −1 −1 | CH 2, ACK |
| 4 | +1 −1 −1 +1 | CH 2, NACK |

TABLE 2

12-bit length orthogonal sequence

| # | Sequence | ACK/NACK feedback |
|---|---|---|
| 1 | +1 +1 +1 +1 +1 −1 +1 −1 +1 +1 −1 −1 | CH 1, ACK |
| 2 | +1 −1 +1 −1 +1 −1 −1 +1 −1 −1 +1 | CH 1, NACK |
| 3 | +1 +1 −1 −1 +1 −1 −1 +1 +1 +1 +1 | CH 2, ACK |
| 4 | +1 −1 −1 +1 +1 +1 +1 +1 −1 +1 −1 | CH 2, NACK |

As shown in Table 1 and Table 2, sequence #1 and sequence #2 may represent ACK/NACK feedback for ACK/NACK feedback channel 1, and sequence #3 and sequence #4 may represent ACK/NACK feedback for ACK/NACK feedback channel 2.

FIG. 2B illustrates an embodiment of mapping the 12-bit sequence on the uplink ACK/NACK feedback channel based on the TDM/CDM design of FIG. 2A. As illustrated in FIG. 2B, each bit of the sequence, i.e., $C_{i,0}$, $C_{i,1}$, $C_{i,2}$, $C_{i,3}$ wherein i may represent index of the FMTs, may be mapped on each subcarrier of HMT 1, HMT 5 and HMT 9.

Figure 3:
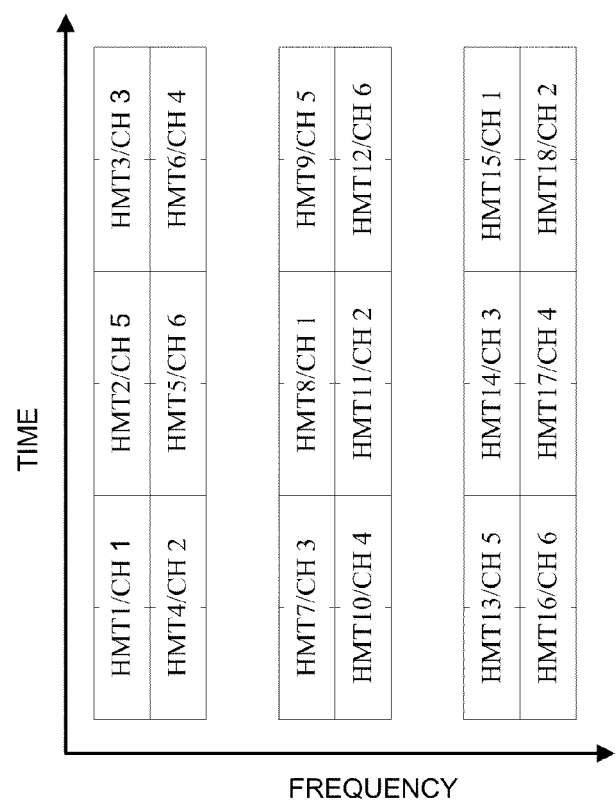
FIG. 3 illustrates an embodiment of a time division multiplexing/frequency division multiplexing (TDM/FDM) design based on the uplink ACK/NACK feedback channel resource unit.

FIG. 3 illustrates an embodiment of a time division multiplexing/frequency division multiplexing (TDM/FDM) design based on the uplink ACK/NACK feedback channel resource unit. Taking the uplink ACK/NACK feedback channel resource unit accommodating six uplink ACK/NACK feedback channels as an example, FMT 1-FMT 3 may be divided into 18 HARQ mini tiles (HMTs), i.e., HMT 1-HMT 18. Each of HMT 1-HMT 18 may be defined as one subcarrier in frequency by two OFDM symbols contiguous in time, 1×2 tiles for short.

Each of ACK/NACK feedback channels may be allocated with three HMTs to transmit the ACK/NACK signal. For example, ACK/NACK feedback channel 1 (referred as "CH 1" in FIG. 3) may be allocated with HMT 1, HMT 8 and HMT 18. Each ACK/NACK feedback channel may be used for one mobile station to transmit the ACK/NACK signal to the base station. In order to improve frequency diversity and/or time diversity, the three HMTs may locate in different frequency and/or time. In an embodiment, HMT 1 may locate in frequency and time different from HMT 8 or HMT 18. For example, HMT 1 may locate in frequency discontinuous with HMT 8 or HMT 18.

It should be understood that other embodiments may implement other modifications and variations to the design of FIG. 3. For example, the uplink ACK/NACK feedback channel resource unit may accommodate less than six ACK/NACK feedback channels. For another example, any two of the three HMTs may be contiguous in frequency and/or time.

Based on the TDM/FDM design of FIG. 3, a sequence of 6-bit length may be used to represent ACK/NACK information for one ACK/NACK feedback channel. In an embodiment, the sequence may be generated through selecting a 2-bit subsequence from a plurality of orthogonal subsequences, e.g., two orthogonal subsequences as shown in Table 3, and repeating the 2-bit subsequence for three times to provide the 6-bit sequence. In another embodiment, the sequence may be generated through selecting a 6-bit sequence from a plurality of orthogonal sequences, e.g., two orthogonal sequences as shown in Table 4.

It should be understood that Tables 1 and 2 are provided for illustration, other corresponding relationships between the subsequences/sequences and the ACK/NACK feedback may be generated, and for example, subsequence #1 or sequence #1 may represent ACK feedback for Channel 2. Moreover, other subsequences/sequences may be used to represent the ACK/NACK feedback. The same or similar scheme may be applied to the ACK/NACK feedback for other channels, such as channels 3, 4, 5 and 6.

TABLE 3

2-bit length orthogonal subsequence

| # | subsequence | ACK/NACK feedback |
|---|---|---|
| 1 | +1 +1 | CH 1, ACK |
| 2 | +1 −1 | CH 1, NACK |

TABLE 4

6-bit length orthogonal sequence

| # | Sequence | ACK/NACK feedback |
|---|---|---|
| 1 | +1 +1 +1 +1 +1 −1 | CH 1, ACK |
| 2 | +1 −1 +1 −1 +1 +1 | CH 1, NACK |

Mapping of the sequence on the allocated HMTs may be similar as the above described with reference to FIG. 2B, and will not be reiterated for simplicity.

Figure 4:
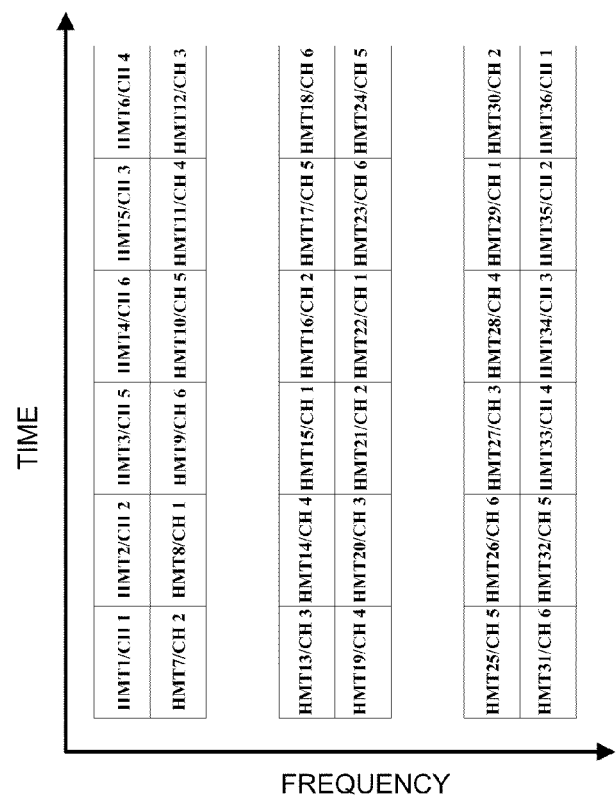
FIG. 4 illustrates an embodiment of another TDM/FDM design based on the uplink ACK/NACK feedback channel resource unit.

FIG. 4 illustrates another embodiment of a time division multiplexing/frequency division multiplexing (TDM/FDM) design based on the uplink ACK/NACK feedback channel resource unit. Taking the uplink ACK/NACK feedback channel resource unit accommodating six uplink ACK/NACK feedback channels as an example, FMT 1-FMT 3 may be divided into 36 HARQ mini tiles (HMTs), i.e., HMT 1-HMT 36. Each of HMT 1-HMT 36 may be defined as one subcarrier in frequency by one OFDM symbol in time, 1×1 tile for short.

Each of HARQ feedback channels may be allocated with six HMTs to transmit the ACK/NACK signal. For example, ACK/NACK feedback channel 1 (referred as "CH 1" in FIG. 4) may be allocated with HMT 1, HMT 8, HMT 15, HMT 22, HMT 29 and HMT 36. Each HARQ feedback channel may be used for one mobile station to transmit the ACK/NACK signal to the base station. In order to improve the frequency diversity and/or time diversity, the six HMTs may locate in different frequency and/or time. For example, HMT 1 may locate in different frequency and time from HMT 8, HMT 15, HMT 22, HMT 29 and HMT 36.

It should be understood that other embodiments may implement other modifications and variations to the design of FIG. 4. For example, the uplink ACK/NACK feedback channel resource unit may accommodate less than six ACK/NACK feedback channels.

Based upon the design of FIG. 4, a sequence of 6-bit length may be used to represent ACK/NACK information for one ACK/NACK feedback channel, which is similar as the above described with reference to FIG. 3. For simplicity, we will not reiterate the sequence representation and sequence mapping for the TDM/FDM design of FIG. 4.

An embodiment of a code division multiplexing (CDM) design based on the ACK/NACK feedback channel resource unit may be described hereinafter. Since no change is made to FIG. 1 for the CDM design, the CDM design will be described with reference to FIG. 1. Taking the uplink ACK/NACK feedback channel resource unit accommodating six uplink ACK/NACK feedback channels as an example, the six ACK/NACK feedback channels may share the uplink ACK/NACK feedback channel resource unit, i.e., FMT 1-FMT 3, to transmit the ACK/NACK signal. In other words, each of the HARQ feedback channels may use the three 2×6 tiles to transmit the ACK/NACK signal.

Based on the CDM design, a sequence of 36-bit length may be used to represent ACK/NACK information for one ACK/NACK feedback channel. In an embodiment, the sequence may be generated through selecting a 12-bit subsequence from a plurality of orthogonal subsequences, e.g., twelve orthogonal subsequences as shown in Table 5, and repeating the 12-bit subsequence for three times to provide the 36-bit sequence.

TABLE 5

12-bit length orthogonal subsequence

| # | Sequence | ACK/NACK feedback |
|---|---|---|
| 1  | 1 1 1 1 1 1 1 1 1 1 1 1 | CH 1, ACK |
| 2  | 1 −1 1 −1 1 1 1 −1 −1 −1 1 1 −1 | CH 1, NACK |
| 3  | 1 −1 −1 1 1 −1 1 1 1 1 −1 −1 −1 1 1 | CH 2, ACK |
| 4  | 1 1 −1 −1 1 1 −1 1 1 1 1 −1 −1 −1 1 | CH 2, NACK |
| 5  | 1 −1 1 1 −1 −1 1 1 −1 1 1 1 1 −1 −1 −1 1 | CH 3, ACK |
| 6  | 1 −1 −1 1 1 −1 −1 1 1 −1 1 1 1 1 −1 | CH 3, NACK |
| 7  | 1 −1 −1 −1 1 1 −1 −1 1 1 −1 1 1 1 1 | CH 4, ACK |
| 8  | 1 1 −1 −1 −1 1 1 −1 −1 1 1 −1 1 1 1 | CH 4, NACK |
| 9  | 1 1 1 −1 −1 −1 1 1 −1 −1 1 1 −1 1 1 | CH 5, ACK |
| 10 | 1 1 1 1 −1 −1 −1 1 1 −1 −1 1 1 −1 1 | CH 5, NACK |
| 11 | 1 −1 1 1 1 1 −1 −1 −1 1 1 −1 −1 1 1 | CH 6, ACK |
| 12 | 1 1 −1 1 1 1 1 −1 −1 −1 1 1 −1 −1 1 | CH 6, NACK |

It should be understood that other corresponding relationships between the sequences and the ACK/NACK feedback may be generated, and for example, sequence #1 may represent ACK feedback for Channel 6. Moreover, other sequences may be used to represent the ACK/NACK feedback.

It should be understood that other embodiments may implement other modifications and variations to the CDM design. For example, the uplink ACK/NACK feedback channel resource unit may accommodate less than six HARQ feedback channels. For another example, a complex orthogonal sequence may be used to represent ACK/NACK feedback for the CDM design. In an embodiment, the complex orthogonal sequence may be obtained from the following expression:

$$C_{nk} = e^{j2\pi nk/N}$$

wherein, n may represent a sequence index, k may represent a sequence element index, N may represent the number of sequences, and $C_{nk}$ may represent value of the $k^{th}$ sequence element of the $n^{th}$ sequence.

Figure 5:
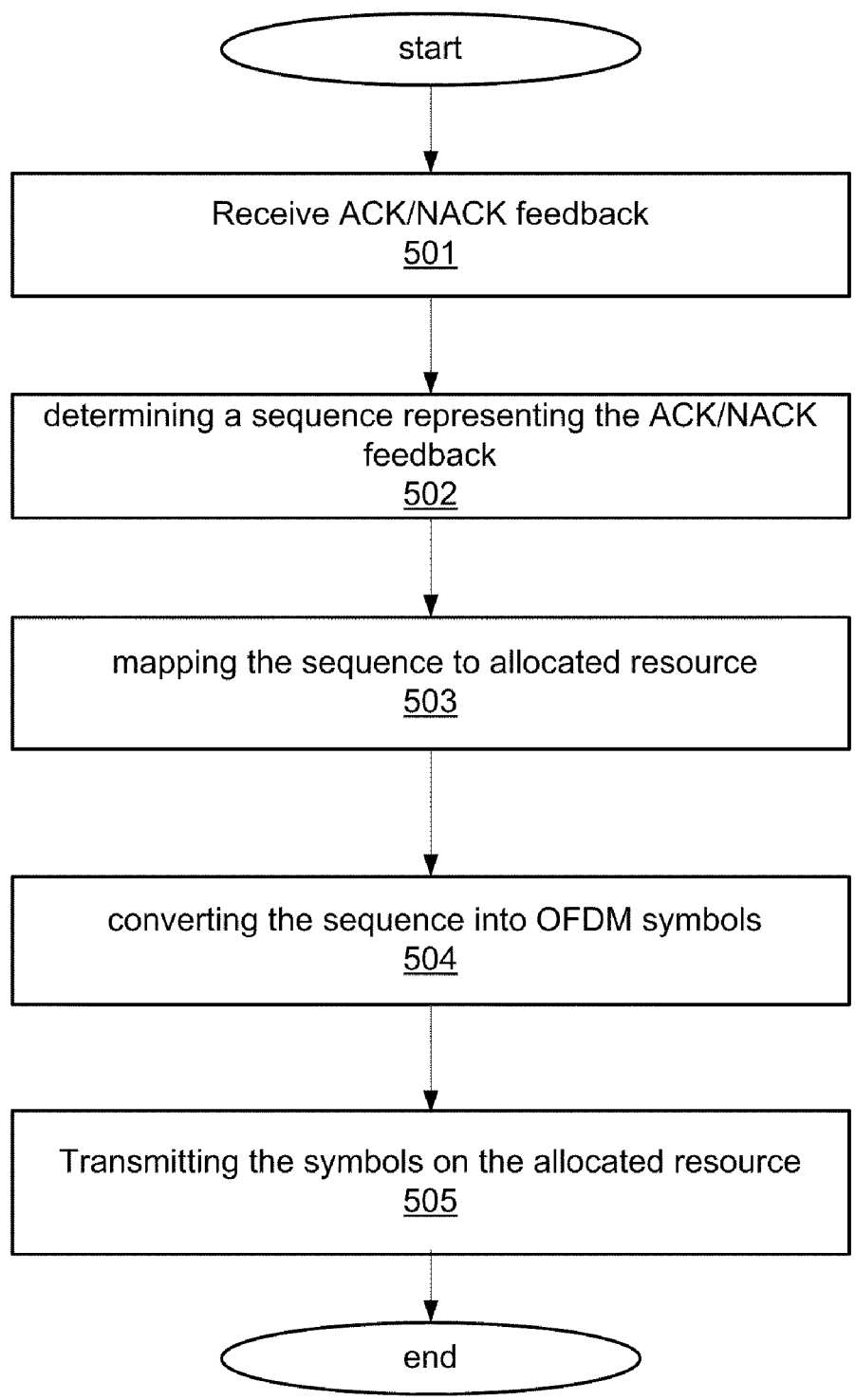
FIG. 5 illustrates an embodiment of a process of generating and transmitting an ACK/NACK signal.

FIG. 5 illustrates an embodiment of a process of generating and transmitting the ACK/NACK signal. In an embodiment, the process of FIG. 5 may be performed by a transcieving device or other device of a mobile station. In block 501, the transcieving device or other device of the mobile station may receive ACK/NACK feedback, for example, from a processor of the mobile station, as a response to a data communication from the base station to the mobile station. In an embodiment, if no error is detected in the data received from the base station, ACK feedback may be generated, and vice versa.

In block 502, the transcieving device or other device of the mobile station may determine a sequence to represent the ACK/NACK feedback. As the above-described, the sequence representation may vary with different designs on the ACK/NACK feedback channel resource unit. Further, different embodiments may implement the sequence determination in different manners. In an embodiment, the sequence may be determined through selecting a sub-sequence from a plurality of subsequences and then repeating the sub-sequence for a pre-determined times. In another embodiment, the sequence may be determined through selecting the sequence from a plurality of sequences.

In block 503, the transcieving device or other device of the mobile station may map the sequence determined in block 502 on an allocated transmission resource. As the above-stated, different transmission resources may be allocated based upon different designs, for example, three 2×2 tiles for TDM/CDM design, six 1×2 tiles for TDM/FDM design and three 2×6 tiles for CDM design. In an embodiment, the transmission resource may be allocated by the base station. In an embodiment, the sequence may be mapped with a manner of one bit on one subcarrier by one OFDM symbol.

In block 504, the transceiving device or other device of the mobile station may convert the sequence in frequency domain to OFDM symbols in time domain. In an embodiment, the transceiving device or other devices of the mobile station may adopt Inverse Fast Fourier Transformation (IFFT) to perform the conversion.

In block 505, the transceiving device or other device of the mobile station may transmit the OFDM symbols to the base station via the allocated transmission resource.

It should be understood that other embodiments may implement other modifications and variations to the process of FIG. 5. For example, if the sequence is in form of bits (1, 0), then after block 502 but before block 503, the transceiving device or other device of the mobile station may modulate the sequence into form of bits (1, −1).

Figure 6:
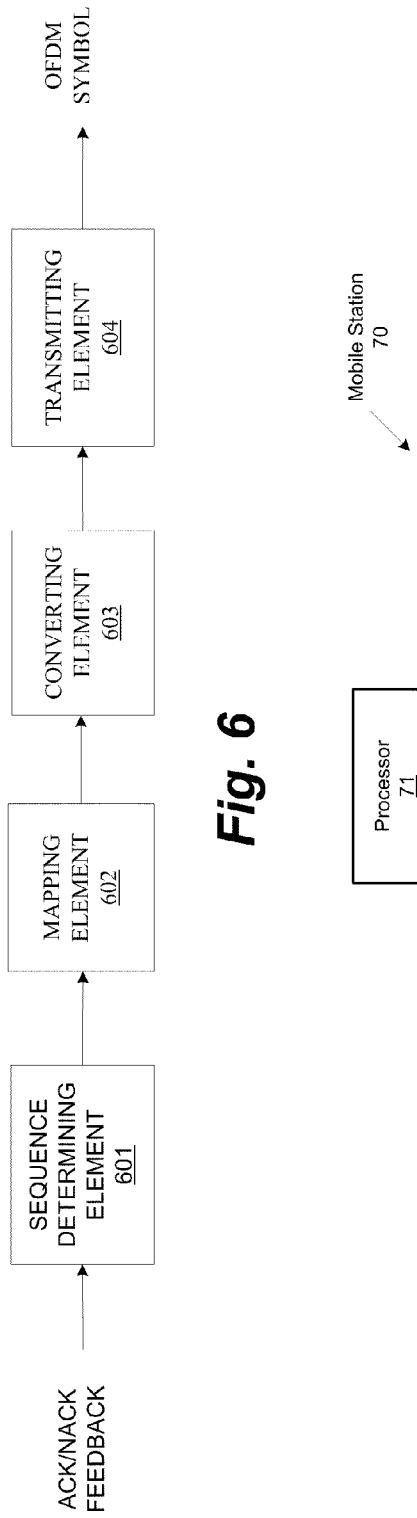
FIG. 6 illustrates an embodiment of an apparatus of generating and transmitting the ACK/NACK signal.

FIG. 6 illustrates an embodiment of an apparatus of generating and transmitting the ACK/NACK signal. For example, the apparatus may be the transceiving device of the mobile station.

In an embodiment, the apparatus may comprise a sequence determining unit 601, a mapping unit 602, a converting unit 603 and a transmitting unit 604.

Sequence determining unit 601 may determine a sequence to represent ACK/NACK feedback received from, for example, a processor of the mobile station as a response to a data communication from the base station to the mobile station. Different embodiments may implement the sequence determination in different manner. In an embodiment, the sequence may be determined through selecting the sub-sequence from a plurality of subsequences and then repeating the sub-sequence for a pre-determined times. In another embodiment, the sequence may be determined through selecting the sequence from a plurality of sequences.

Mapping unit 602 may map the sequence onto an allocated transmission resource. As the above-stated, different transmission resources may be allocated based upon different designs, for example, three 2×2 tiles for TDM/CDM design, six 1×2 tiles for TDM/FDM design and three 2×6 tiles for CDM design. In an embodiment, the transmission resource may be allocated by the base station. In an embodiment, the sequence may be mapped with a manner of one bit on one subcarrier by one OFDM symbol.

Converting unit 603 may convert the sequence in frequency domain into OFDM symbols in time domain. In an embodiment, converting unit 603 may adopt Inverse Fast Fourier Transformation (IFFT) to perform the conversion.

Transmitting unit 604 may transmit the OFDM symbols to the base station via the allocated transmission resource.

It should be understood that other embodiments may implement other modifications and variations to the apparatus of FIG. 6. For example, if the sequence is in form of bits (1, 0), then the apparatus may further comprise a modulating unit between sequence determining 601 and mapping unit 602 to modulate the sequence output from the sequence determining unit 601 into form of bits (1, −1).

Figure 7:
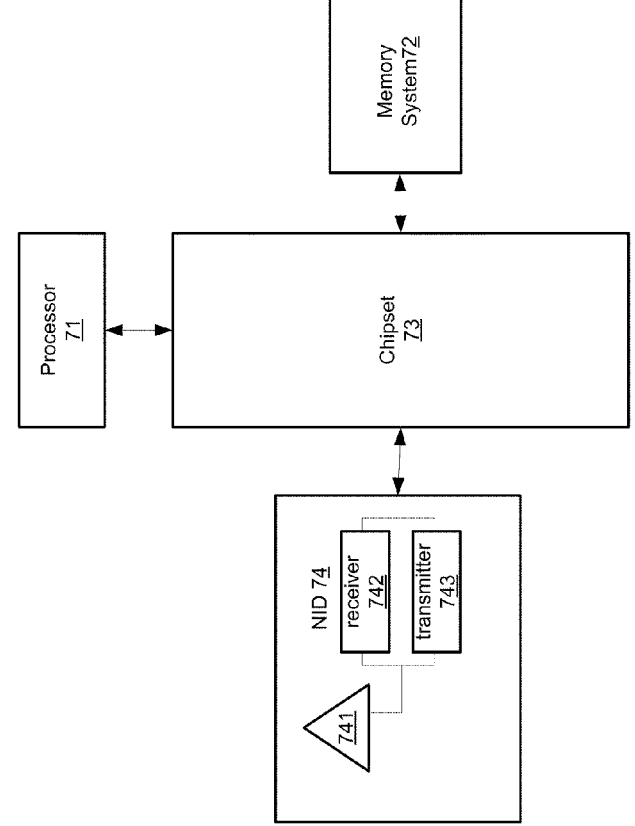
FIG. 7 illustrates an embodiment of a mobile station.

FIG. 7 illustrates an embodiment of the mobile station. Mobile station 70 may comprise one or more processor 71, memory system 72, chipset 73, network interface device (NID) 74, and possibly other components.

One or more processors 71 may be communicatively coupled to various components (e.g., the chipset 73) via one or more buses such as a processor bus. Processors 71 may be implemented as an integrated circuit (IC) with one or more processing cores that may execute codes under a suitable architecture.

Memory 72 may store instructions and data to be executed by the processor 71. Examples for memory 72 may comprise one or any combination of the following semiconductor devices, such as synchronous dynamic random access memory (SDRAM) devices, RAMBUS dynamic random access memory (RDRAM) devices, double data rate (DDR) memory devices, static random access memory (SRAM), and flash memory devices.

Chipset 73 may provide one or more communicative paths among one or more processors 71, memory 72 and other components, such as NID 74. NID 74 may input or output data streams to or from mobile station 70. In an embodiment, NID 74 may include an antenna array 741, a receiver 742 and a transmitter 743. Receiver 742 may process the data streams received via antenna array 741, for example, radio frequency to base frequency transformation, analog to digital transformation, demodulation, etc. On the contrary, transmitter 743 may process the data streams to be transmitted via antenna array 741, for example, modulation, digital to analog transformation, base frequency to radio frequency transformation, etc.

Figure 8:
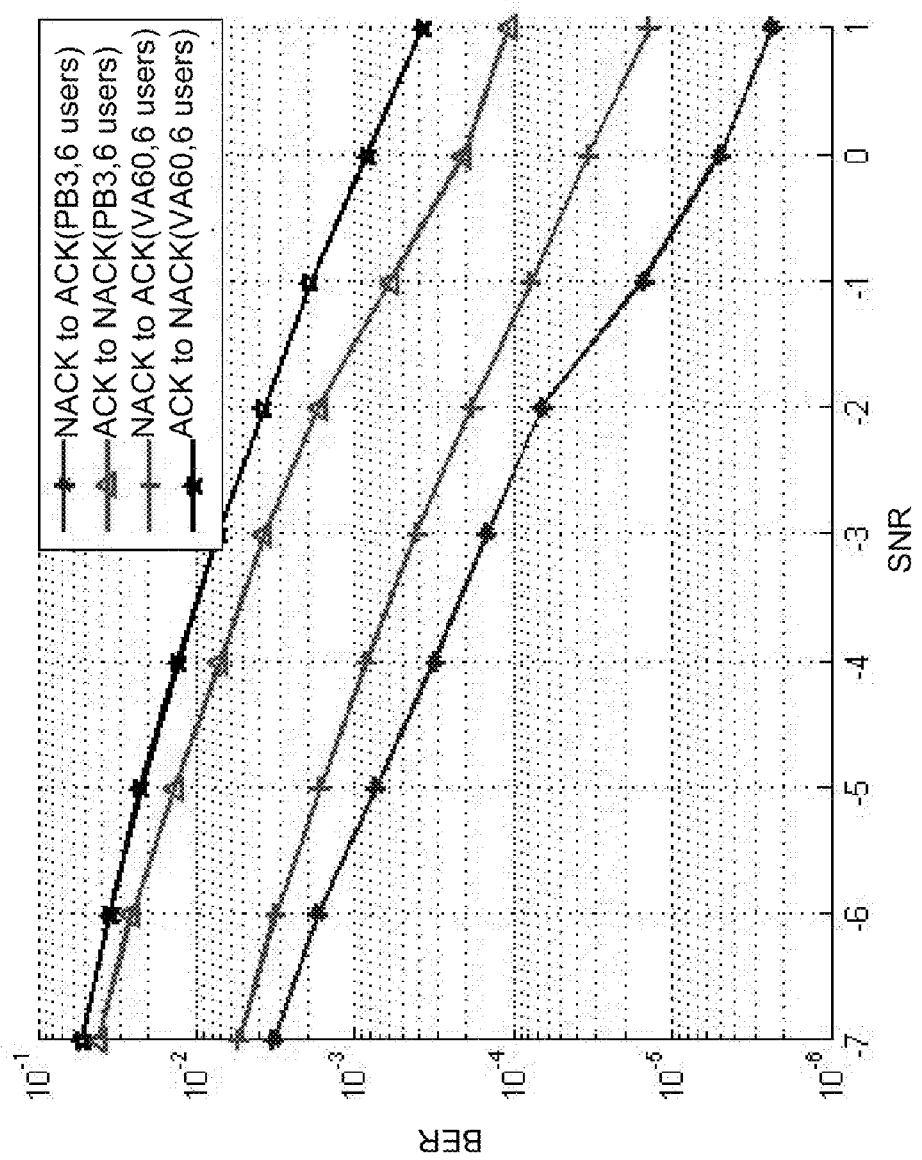
FIGS. 8-11 illustrate performance of the TDM/CDM design and TDM/FDM design.
Figure 9:
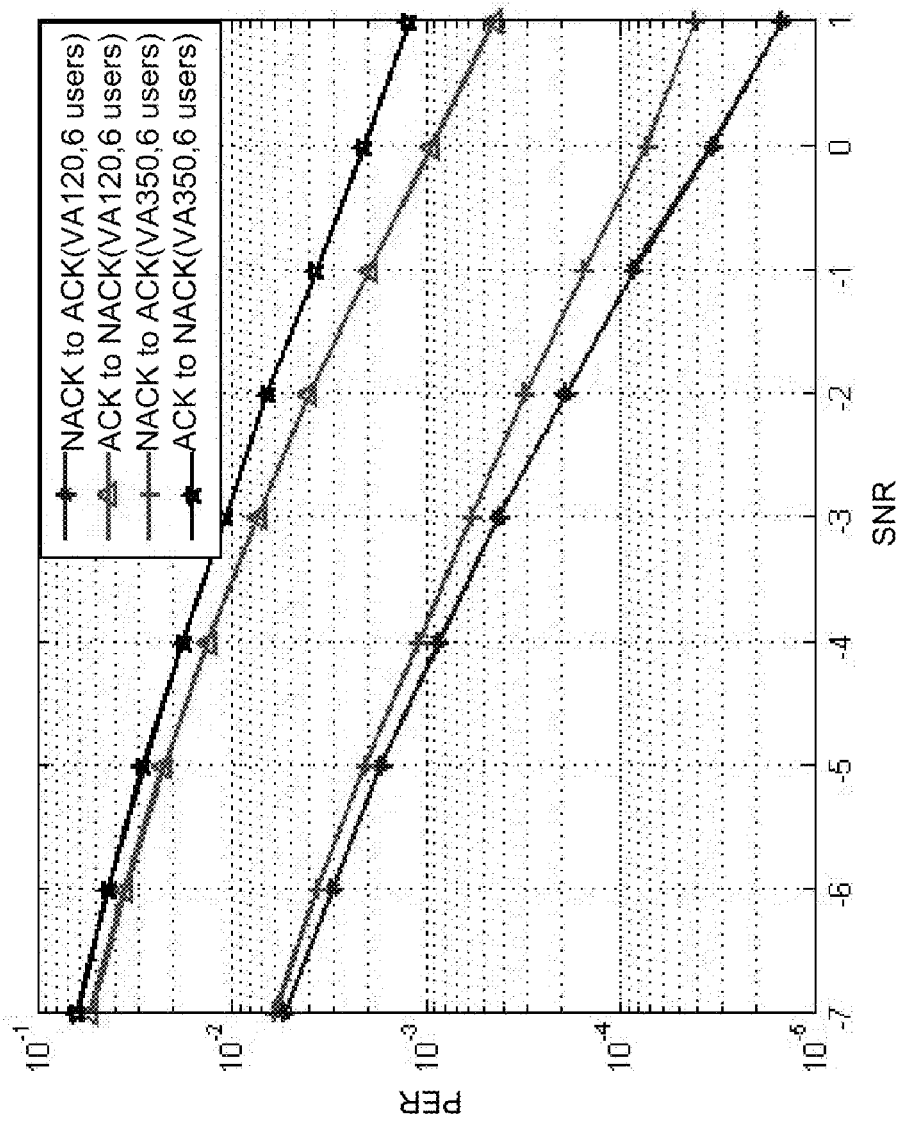

FIGS. 8-11 illustrate performance of the TDM/CDM design and TDM/FDM design. FIGS. 8-9 illustrate performance of the uplink ACK/NACK channel using the TDM/CDM design with variant vehicle speeds. Because power of each subcarrier may be boosted with 4.7 dB, bit error rate (BER) vs. signal noise rate (SNR) or packet error rate (PER) vs. SNR for the TDM/CDM design may be improved.

Figure 10:
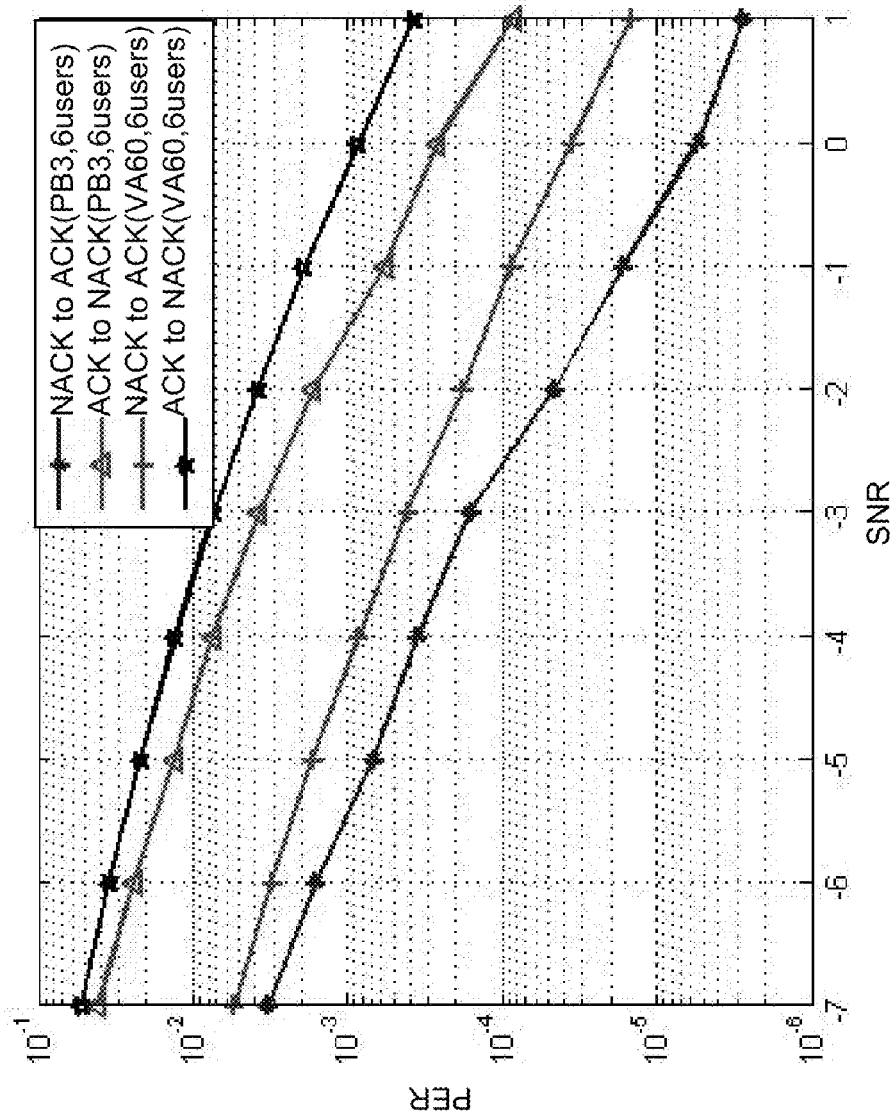
Figure 11:
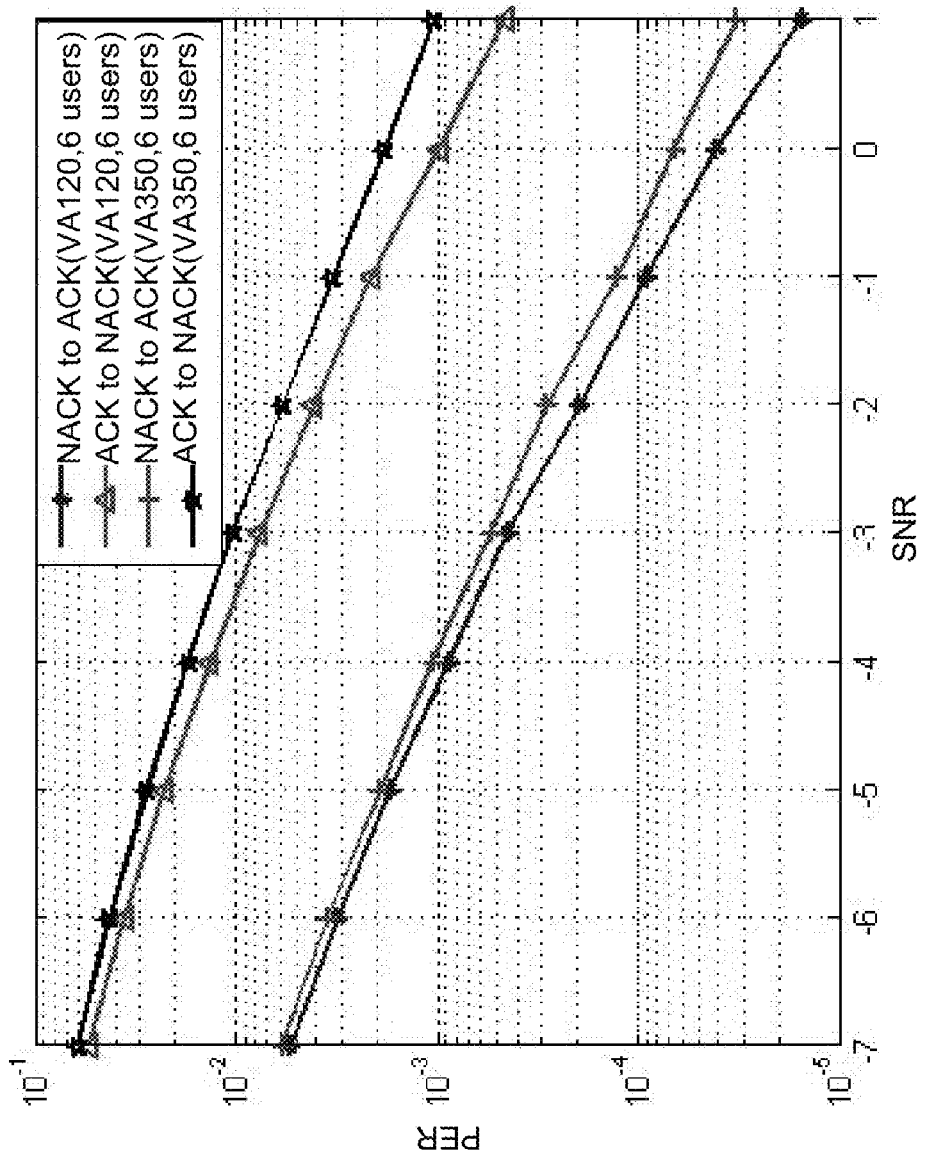

FIG. 10-11 illustrate performance of the uplink ACK/NACK channel using the TDM/FDM design with variant vehicle speeds. Because power of each subcarrier may be boosted with 7.7 dB, BER vs. SNR or PER vs. SNR for the TDM/FDM design may be improved.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An apparatus of a mobile station, comprising:
    a processor;
    a sequence determining element operative on the processor to determine a sequence corresponding to one of acknowledge (ACK) information and not-acknowledge (NACK) information; and
    a mapping element operative on the processor to map the sequence on a transmission channel for later transmission from the mobile station to a base station,
    wherein the transmission channel is allocated with at least a part of three feedback mini-tiles (FMTs), each of the FMTs comprising two subcarriers contiguous in a frequency domain by six orthogonal frequency division multiplexing (OFDM) symbols contiguous in a time domain and the three FMTs being discontinuous in the frequency domain.

2. The apparatus of claim 1, wherein the transmission channel shares three blocks of the three FMTs with another transmission channel allocated for another mobile station, wherein each of the three blocks comprises two subcarriers contiguous in the frequency domain by two OFDM symbols contiguous in the time domain and the three blocks are discontinuous in the frequency domain.

3. The apparatus of claim 2, wherein the determining element determines the sequence by selecting the sequence from a plurality of twelve bits orthogonal sequences.

4. The apparatus of claim 1, wherein the transmission channel is allocated with three blocks of the three FMTs, wherein each of the three blocks comprises one subcarrier in the frequency domain by two OFDM symbols contiguous in the time domain and the three blocks are discontinuous in the frequency domain.

5. The apparatus of claim 4, wherein the determining element determines the sequence by selecting the sequence from a plurality of six bits orthogonal sequences.

6. The apparatus of claim 1, wherein the transmission channel shares the three FMTs with five other transmission channels allocated for five other mobile stations.

7. The apparatus of claims 6, wherein the determining element determines the sequence by selecting the sequence from a plurality of thirty-six bits orthogonal sequences.

8. A method performed by a mobile station, comprising:
determining a sequence corresponding to one of acknowledge (ACK) information and non-acknowledge (NACK) information; and
mapping the sequence onto a transmission channel for later transmission from the mobile station to a base station, wherein, the transmission channel is allocated with at least a part of three feedback mini-tiles (FMTs), each of the FMTs comprising two subcarriers contiguous in a frequency domain by six orthogonal frequency division multiplexing (OFDM) symbols contiguous in a time domain and the three FMTs being discontinuous in the frequency domain.

9. The method of claim 8, wherein the transmission channel shares three blocks of the three FMTs with another transmission channel allocated for another mobile station, wherein each of the three blocks comprises two subcarriers contiguous in the frequency domain by two OFDM symbols contiguous in the time domain and the three blocks are discontinuous in the frequency domain.

10. The method of claim 9, wherein the determining comprises selecting the sequence from a plurality of twelve bits orthogonal sequences.

11. The method of claim 8, wherein the transmission channel is allocated with six blocks of the three FMTs, wherein each of the six blocks comprises one subcarrier in the frequency domain by one OFDM symbols in the time domain and the six blocks locate in different frequency and time.

12. The method of claim 11, wherein the determining comprises selecting the sequence from a plurality of six bits orthogonal sequences.

13. The method of claim 8, wherein the transmission channel shares the three FMTs with five other transmission channels allocated for five other mobile stations.

14. The method of claims 13, wherein the determining comprises selecting the sequence from a plurality of complex orthogonal sequences obtained from an expression:

$$C_{nk}=e^{j2\pi nk/N}$$

wherein, n represents a sequence index, k represents a sequence element index, N represents the number of sequences, and $C_{nk}$ represents value of the $k^{th}$ sequence element of the $n^{th}$ sequence.

15. A non-transitory computer readable medium encoded with computer executable instructions, which when accessed, causes a mobile station to perform operations comprising:
determining a sequence corresponding to one of acknowledge (ACK) information and non-acknowledge (NACK) information; and
mapping the sequence onto a transmission channel for later transmission from the mobile station to a base station, wherein, the transmission channel is allocated with at least a part of three feedback mini-tiles (FMTs), each of the FMTs comprising two subcarriers contiguous in a frequency domain by six orthogonal frequency division multiplexing (OFDM) symbols contiguous in a time domain and the three FMTs being discontinuous in the frequency domain.

16. The computer readable medium of claim 15, wherein the transmission channel shares three blocks of the three FMTs with another transmission channel allocated for another mobile station, wherein each of the three blocks comprises two subcarriers contiguous in the frequency domain by two OFDM symbols contiguous in the time domain and the three blocks are discontinuous in the frequency domain.

17. The computer readable medium of claim 16, wherein the operation of determining comprises selecting the sequence from a plurality of twelve bits orthogonal sequences.

18. The computer readable medium of claim 17, wherein the transmission channel is allocated with three blocks of the three FMTs, wherein each of the three blocks comprises one subcarrier in the frequency domain by two OFDM symbols contiguous in the time domain and the three blocks are discontinuous in the frequency domain.

19. The computer readable medium of claim 18, wherein the operation of determining comprises selecting the sequence from a plurality of six bits orthogonal sequences.

20. The computer readable medium of claim 19 wherein the transmission channel shares the three FMTs with five other transmission channels allocated for five other mobile stations.

21. The computer readable medium of claims 20, wherein the operation of determining comprises selecting the sequence from a plurality of thirty-six bits orthogonal sequences.

22. A mobile station, comprising:
A processor;
A transceiver, coupled to the processor, to determine a sequence corresponding to one of ACK information and NACK information provided by the processor and to map the sequence onto a transmission channel for later transmission from the mobile station to a base station, wherein, the transmission channel is allocated with at least a part of three feedback mini-tiles (FMTs), each of the FMTs comprising two subcarriers contiguous in a frequency domain by six orthogonal frequency division multiplexing (OFDM) symbols contiguous in a time domain and the three FMTs being discontinuous in the frequency domain.

23. The mobile station of claim 22, wherein the transmission channel shares three blocks of the three FMTs with another transmission channel allocated for another mobile station, wherein each of the three blocks comprises two subcarriers contiguous in the frequency domain by two OFDM symbols contiguous in the time domain and the three blocks are discontinuous in the frequency domain.

24. The mobile station of claim 23, wherein the transceiver determines the sequence by selecting the sequence from a plurality of twelve bits orthogonal sequences.

25. The mobile station of claim 23, wherein the transmission channel is allocated with three blocks of the three FMTs, wherein each of the three blocks comprises one subcarrier in the frequency domain by two OFDM symbols contiguous in the time domain and the three blocks are discontinuous in the frequency domain.

* * * * *

UNITED STATES PATENT AND TRADEMARK OFFICE
CERTIFICATE OF CORRECTION

PATENT NO.        : 8,300,585 B2
APPLICATION NO.   : 12/554355
DATED             : October 30, 2012
INVENTOR(S)       : Changlong Xu et al.

It is certified that error appears in the above-identified patent and that said Letters Patent is hereby corrected as shown below:

In column 9, line 22, in claim 7, delete "claims" and insert -- claim --, therefor.

In column 9, line 59, in claim 14, delete "claims" and insert -- claim --, therefor.

In column 10, line 43, in claim 21, delete "claims" and insert -- claim --, therefor.

In column 10, line 48, in claim 22, delete "A" and insert -- a --, therefor.

In column 10, line 49, in claim 22, delete "A" and insert -- a --, therefor.

Signed and Sealed this
Twenty-second Day of January, 2013

David J. Kappos
*Director of the United States Patent and Trademark Office*